Patented Sept. 29, 1925.

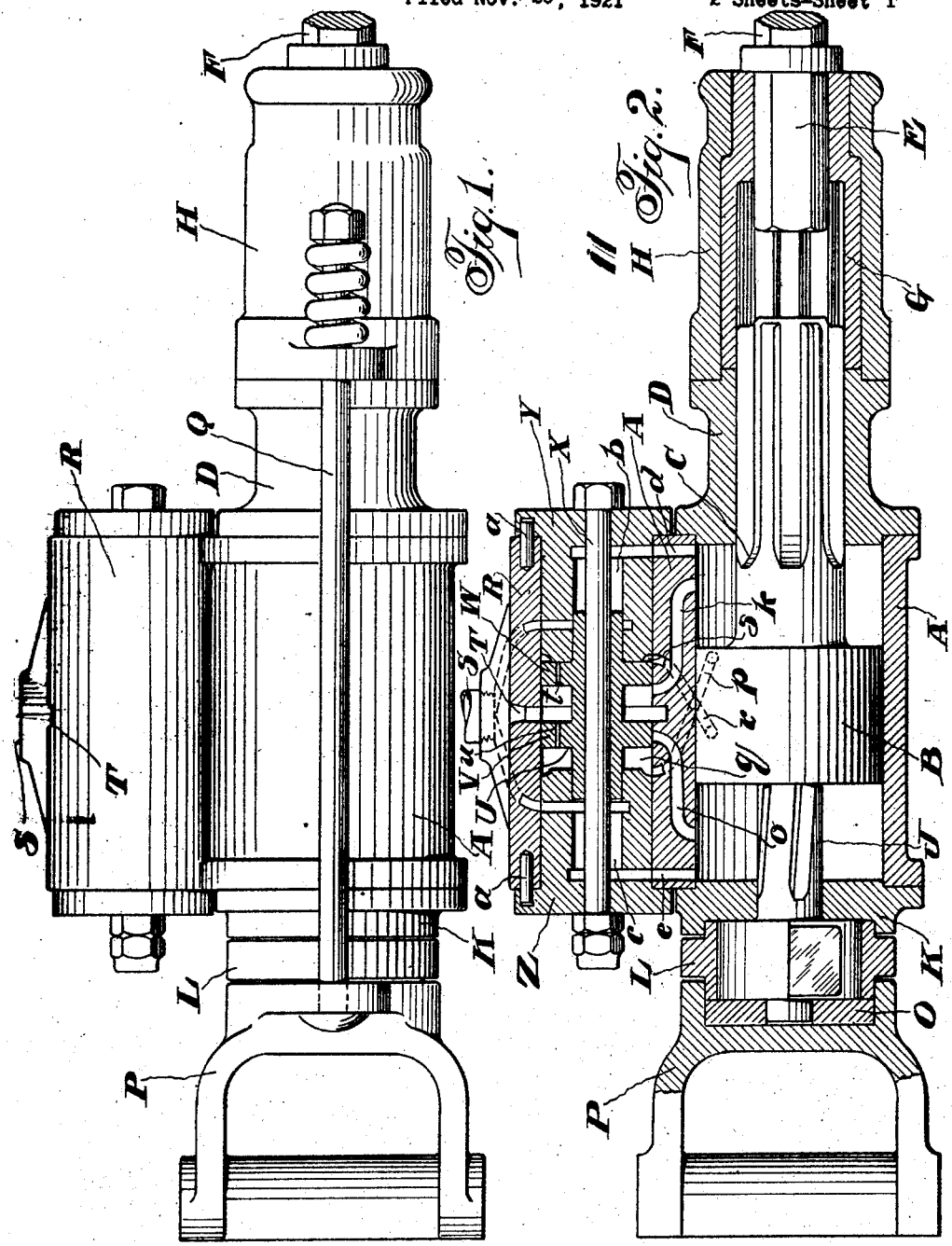

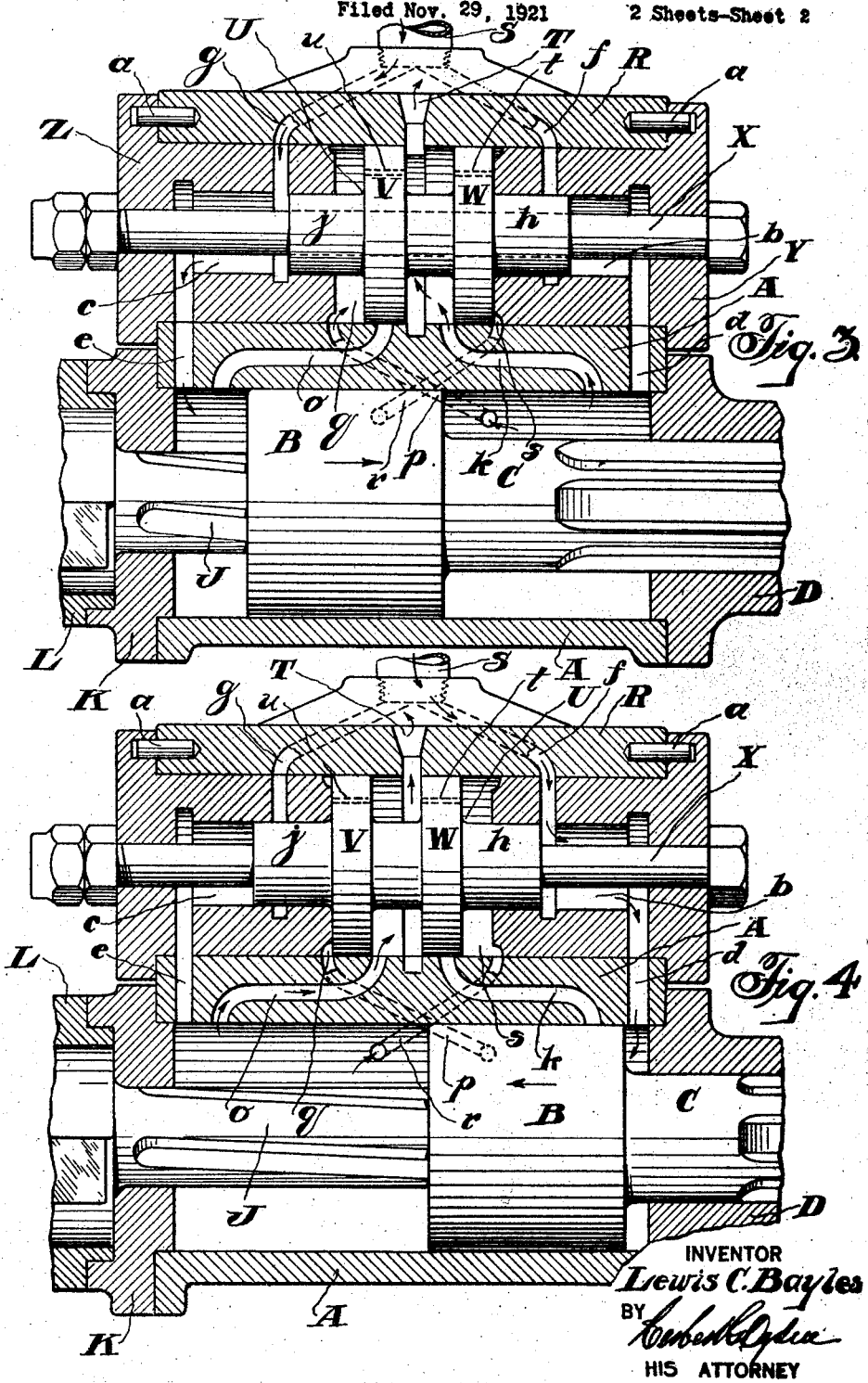

1,554,984

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

FLUID-ACTUATED DISTRIBUTING VALVE FOR ROCK DRILLS.

Application filed November 29, 1921. Serial No. 518,548.

*To all whom it may concern:*

Be it known that I, LEWIS C. BAYLES, a citizen of the United States, and a resident of Easton, county of Northampton, and State of Pennsylvania, have invented a certain Fluid-Actuated Distributing Valve for Rock Drills, of which the following is a specification accompanied by drawings.

This invention relates to fluid actuated machines, such as rock drills and the like, of different types, but more particularly to a fluid actuated distributing valve.

The objects of the invention are to improve upon such valves, reduce the cost of manufacture, increase the efficiency of the machine, and produce a reciprocating valve of the pressure thrown spool type, which has short direct passages for inlets and outlets, and at the same time enable the outlet to be constructed as free and large as possible.

Further objects of the invention are to secure a valve as light as practicably possible and quick and positive in its action, without complication of ports and passages.

The invention is illustrated in the accompanying drawings, in which—

Figure 1 is an outside elevation of a machine embodying the invention,

Figure 2 is a longitudinal sectional view of Figure 1, and

Figures 3 and 4 are enlarged detail longitudinal sectional views similar to a portion of Figure 2, illustrating the parts of the device in different positions.

Referring to the drawings, the cylinder A of a rock drill shown in this instance as a jackhammer, for purposes of illustration, is provided with a piston hammer reciprocating therein, having the head B and the forward fluted extension C passing through the front cylinder washer D, and adapted to impart the blows of impact to the shank E of a drill steel F, extending into the rotation sleeve G in the front head H. The drill steel is automatically rotated by the usual rifle bar J passing through the cylinder back head K and the rotation ratchet L is located between the back head and the guide plate O over which a handle P is secured, the parts being held together by the usual side bolts Q.

The machine is provided with a distributing valve chest R shown in this instance as a part of the cylinder A, and provided with the inlet S for the supply of motive fluid. The exhaust from the valve chest to atmosphere is indicated at the port T. The distributing valve U reciprocates in the valve chamber, formed in the valve chest R and is formed with two annular flanges V and W intermediate its length. For purposes of illustration, the valve U is shown slidable on the bolt X, which also holds the valve bushings Y and Z in the ends of the valve chest, and suitable dowel pins $a$ may be provided for locating the valve bushings. It is to be understood, however, that any suitable and convenient form of valve chest and associated parts may be provided instead of those shown.

The spaces $b$ and $c$ in the valve chamber at each end of the valve, are in constant communication with the corresponding ends of the cylinder through the ports $d$ and $e$ respectively, and communication between the inlet S and the said spaces $b$ and $c$ in the valve chamber at each end of the valve, through the passages $f$ and $g$, is controlled by the ends $h$ and $j$ of the valve. Main exhaust passages $k$ and $o$ for controlling the entire exhaust lead from each side of the piston B to the valve chamber, and each exhaust passage is controlled by one of the valve flanges W and V, as indicated in the drawings.

A passage $p$ leads from a point in the cylinder intermediate the center, and the forward end, to the space $q$ in the valve chamber rearward of the valve flanges, and another passage $r$ leads from a point in the cylinder intermediate the center and the rearward end of the cylinder bore to the space $s$ in the valve chamber, forward of the valve flanges W and V, both of these passages $p$ and $r$ being for the purpose of conducting motive fluid to operate the distributing valve U. Small vents $t$ and $u$ to atmosphere, are provided for preventing leakage from the inlet S and supply passages $f$ and $g$ along the valve ends $h$ and $j$ from building up pressure in the valve chamber spaces $s$ and $q$ at the outer ends of the valve flanges W and V. These vents $t$ and $u$ may be in any suitable position for accomplishing the desired purpose, and need not necessarily be located in the valve flanges W and V, as shown for illustrative purposes.

In the operation of the machine, let it be assumed, that the piston B is in the position indicated in Figure 3, and is moving in the cylinder on its forward stroke. The valve U is also in its forward position, as indicated, and motive fluid passes from the inlet S through the valve chamber space $c$ and thence behind the piston to drive it forward. The exhaust passage $o$ from the rearward end of the cylinder is closed, and motive fluid is exhausted from in front of the piston through the open exhaust passage $k$. The valve U is held in forward position for the desired length of time, due to pressure fluid, through the passage $g$ communicating with the valve chamber space $c$ rearward of the valve end $j$.

As the piston completes its forward stroke and uncovers the passage $r$, as indicated in Figure 4, live pressure fluid is admitted to the valve chamber space $s$ forwardly of the valve flanges W and V, and throws the valve rearwardly, closing the exhaust passage $k$ and opening the exhaust passage $o$. The area of the pressure surface of either flange V or W is considerably greater than the area of the ends $h$ and $j$ of the valve. The valve is held in its rearward position by the pressure in the space $b$ over the end $h$ of the valve, and as communication from the inlet S through the valve chamber space $b$ to the forward end of the cylinder is now open, motive fluid will actuate the piston rearwardly and the cycle will be continued indefinitely.

No compression is required to throw my improved valve, but the valve is completely actuated in both directions throughout its entire movement by live air alone and held in position by live air until thrown in the opposite direction. The valve is light, quick and positive in action and has a small number of ports and passages, which are short in length for operating purposes.

The fact that no compression is required to throw the valve makes it possible if desired to join the ports $d$ and $k$ and likewise the ports $e$ and $o$ before they enter the cylinder, but I do not illustrate such joining of the ports, as I prefer the construction shown, and the modification is obvious to those skilled in the art.

I claim:

In a fluid actuated rock drill of the hammer type, the combination of a cylinder and reciprocating hammer piston, a valve chest, and a distributing valve in said chest controlling the inlet and also controlling the entire exhaust from the cylinder, and actuated in opposite directions solely by pressure fluid under working pressure, said valve having two central flanges of sufficiently greater diameter than the diameter of the smaller ends of the valve, to create differential pressure surfaces, piston controlled passages arranged to exert pressure alternately upon the outer surfaces of said flanges for actuating the valve throughout its travel by pressure fluid under working pressure and without compression, and leak ports to atmosphere for preventing leakage of live pressure fluid from the inlet around the smaller ends of the valve from building up pressure against said outer surfaces of the flanges.

In testimony whereof I have signed this specification.

LEWIS C. BAYLES.